April 23, 1946.   J. H. DORAN   2,399,008
HYDRAULIC GEAR OF THE POSITIVE DISPLACEMENT TYPE
Filed Aug. 22, 1942   3 Sheets-Sheet 1

Inventor:
John H. Doran,
by *Harry E. Dunham*
His Attorney.

April 23, 1946. J. H. DORAN 2,399,008
HYDRAULIC GEAR OF THE POSITIVE DISPLACEMENT TYPE
Filed Aug. 22, 1942 3 Sheets-Sheet 2

Inventor:
John H. Doran,
by Harry E. Dunham
His Attorney.

April 23, 1946.   J. H. DORAN   2,399,008
HYDRAULIC GEAR OF THE POSITIVE DISPLACEMENT TYPE
Filed Aug. 22, 1942   3 Sheets-Sheet 3

Inventor:
John H. Doran,
by Harry E. Dunham
His Attorney.

Patented Apr. 23, 1946

2,399,008

UNITED STATES PATENT OFFICE 2,399,008

HYDRAULIC GEAR OF THE POSITIVE DISPLACEMENT TYPE

John H. Doran, Scotia, N. Y., assignor to General Electric Company, a corporation of New York Application August 22, 1942, Serial No. 455,806

1 Claim. (Cl. 103—126)

The present invention relates to hydraulic gears of the positive displacement type such as are used as pumps for pumping liquid and as motors and hydraulic couplings.

The object of my invention is to provide an improved construction of such hydraulic gears of the positive displacement type whereby better efficiency and economy are attained.

For a consideration of what I believe to be novel and my invention, attention is directed to the following description and the claim appended thereto in connection with the accompanying drawings.

Figure 1:
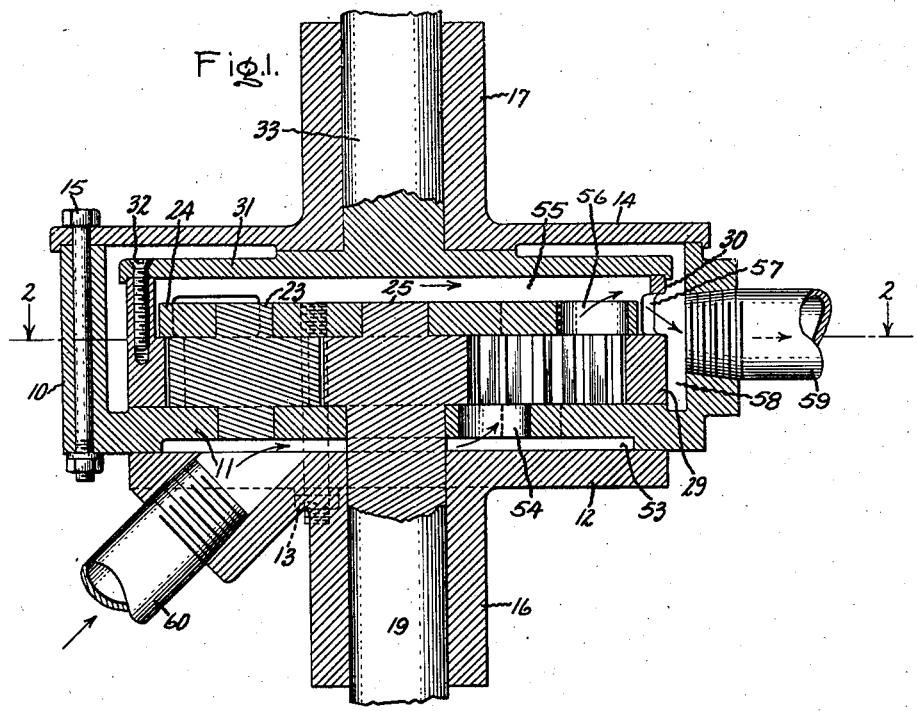
Figure 2:
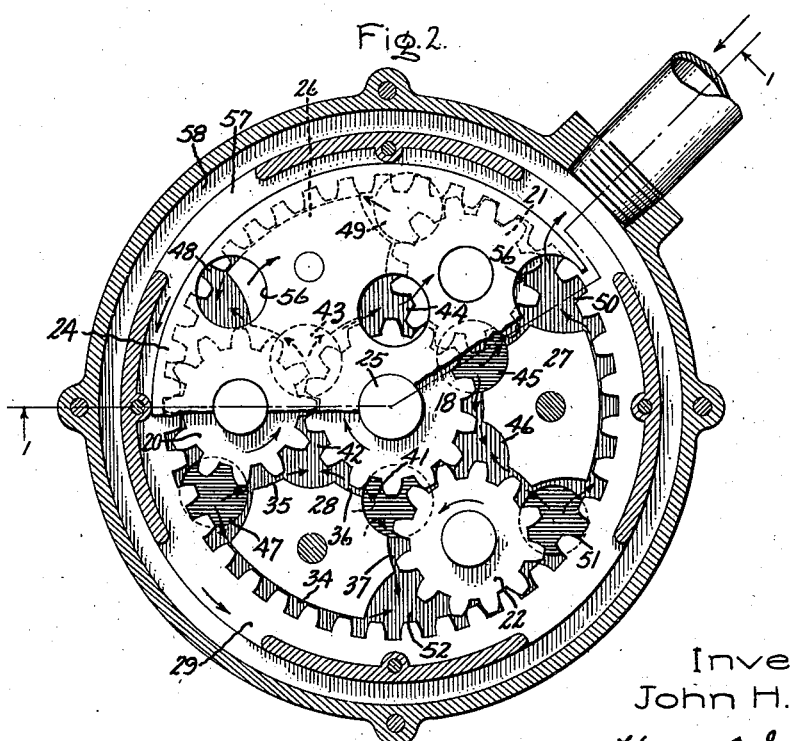
Figure 3:
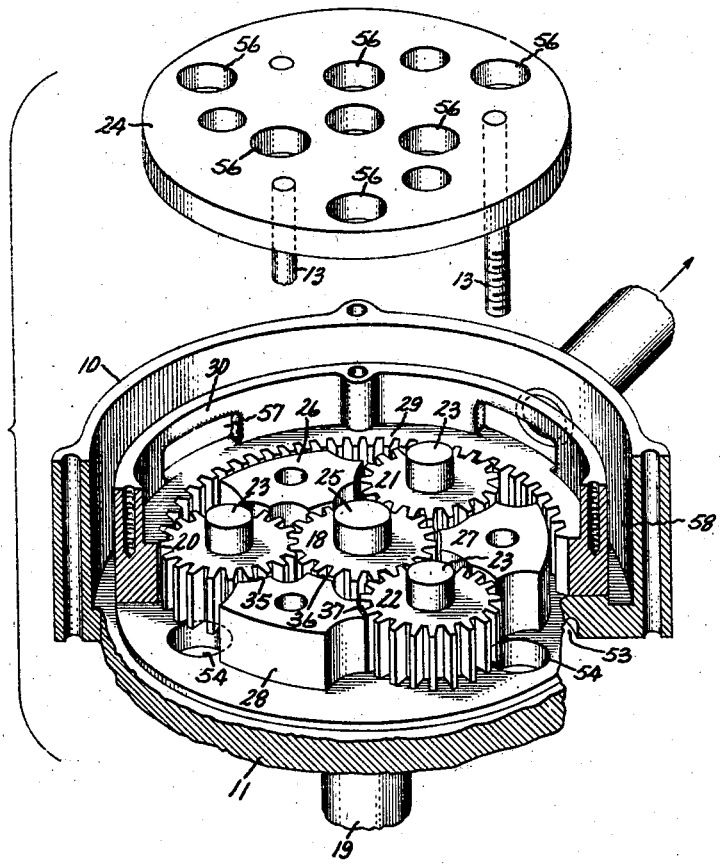
Figures 4, 5:
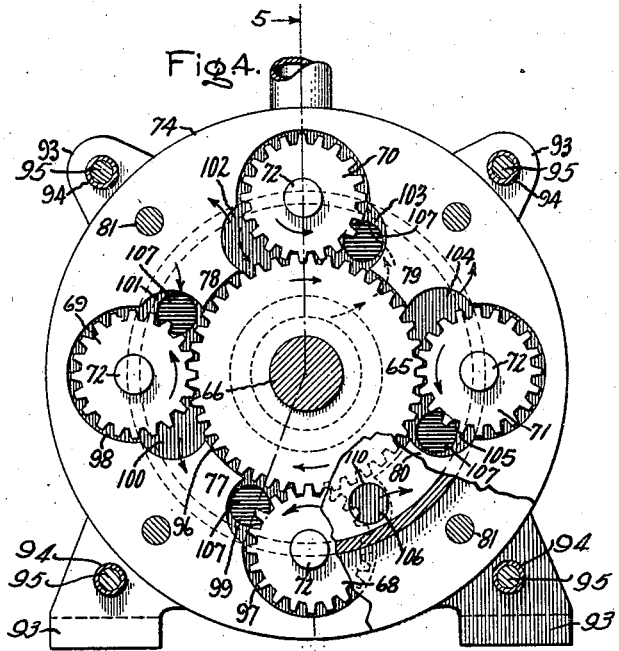

In the drawings Fig. 1 illustrates a sectional view of a hydraulic gear embodying my invention; Fig. 2 is a section along line 2—2 of Fig. 1, Fig. 1 being a section along line 1—1 of Fig. 2; Fig. 3 is a perspective view of the arrangement shown in Fig. 1; and Figs. 4 and 5 illustrate a modification according to my invention, Fig. 4 being a section along line 4—4 of Fig. 5 and Fig. 5 a section along lines 5—5 of Fig. 4.

In the following I shall describe the embodiment disclosed in Figs. 1 to 3 as a pump with the various gears rotating in a definite direction although, as will become apparent from the following, the hydraulic gear may be operated either as a pump or a motor and the gears may be rotated in either direction in which case an inlet during operation in one direction becomes an outlet or discharge during operation in the opposite direction.

The hydraulic gear or pump of Figs. 1 to 3 has a cylindrical casing 10 with an inner bottom or mounting plate 11 integrally formed therewith. An outer bottom plate 12 is secured to the inner plate 11 by means including studs 13. A cover or top plate 14 is fastened to the cylindrical casing by a plurality of bolts 15. The bottom plate and the top plate 14 form central cylindrical extensions or bearings 16 and 17 respectively. A central or sun gear 18 is disposed within the casing and secured to a shaft 19 supported on the bearing 16. The gear 18 meshes with a plurality of planetary gears, in the present instance three planetary gears 20, 21 and 22 circumferentially uniformly spaced about the sun gear 18. Each gear has a shaft 23 which on one side of the gear is mounted in a bearing formed by the inner bottom plate 11 and on the other side of the gear is mounted in a bearing formed by a plate 24. An upper extension 25 of the shaft 19 is supported in a central bearing formed by the plate 24.

The aforementioned studs 13 are likewise secured in the plate 24. Each stud 13 passes through one of three spacer blocks 26, 27 and 28. These blocks may be integrally formed with one of the plates 11 and 24. They provide a fixed spacing between these plates. The planetary gears 20, 21, 22 mesh with an outer or ring gearing 29 concentrically disposed within the casing 10 and provided with an upper cylindrical extension 30 secured to a disk 31 by a plurality of bolts 32. The disk 31 is fastened to a shaft 33 supported on the bearing 17.

The arrangement so far described is similar to a planetary gearing having a sun gear, a plurality of planetary gears and an outer gear. Rotation of the sun gear is transmitted through the planetary gears to the outer gear, causing rotation of the latter in the opposite direction from that of the sun gear and vice-versa. Rotation of the sun gear shaft 19 at a fixed speed causes slow rotation of the outer gear and the shaft 33, and rotation of shaft 33 with the outer gear at a fixed speed causes faster rotation of the sun gear and the shaft 19.

Each of the spacer blocks 26, 27 and 28 has a plurality of cylindrical surfaces, each concentric with an adjacent gear. Thus (Fig. 2) the block 28 has a first cylindrical surface 34 concentric with the outer gear 29, a second cylindrical surface 35 concentric with the planetary gear 20, a third cylindrical surface 36 concentric with the sun gear 18, and a fourth cylindrical surface 37 concentric with the planetary gear 22. The gears and the blocks define spaces between them; more particularly the sun gear, the planetary gears and the blocks form spaces 41 to 46 inclusive. The planetary gears, the ring gear and the blocks form spaces 47 to 52 inclusive; the space 41 being formed by the sun gear, the planetary gear 22 and the block 28; the space 42 being formed by the sun gear, the block 28 and the planetary gear 20; the space 47 being formed between the planetary gear 20, the ring gear 27 and the block 28; the space 48 being formed between the ring gear, the planetary gear 20 and the block 26, etc.

The inner bottom or bearing plate 11 has a recessed portion spaced from the bottom plate 12 and forming therewith a chamber 53. The aforementioned spaces with uneven numbers 41, 43, 45, 47, 49 and 51 communicate through openings 54 in the inner bottom plate 11 with the chamber 53. The upper bearing plate 24 and the disk 31 together with the extension 30 of the ring gear form a chamber 55. The aforementioned spaces with even numbers 42, 44, 46, 48, 50 and 52 communicate with the chamber 55 through openings 56 in the plate 24. The cylindrical extension 30 has a plurality of openings 57 establishing communication between the chamber 55 and an annular chamber 58 between the ring gear and the casing 10. The chamber 58 is connected to a conduit 59 and the chamber 53 is connected to a conduit 60. The arrangement may be operated as a pump by rotating either of the shafts 19 and 33. Let us assume that the shaft 19 is rotated in clockwise direction or the shaft 33 is rotated in counterclockwise direction. During such operating condition, the gears will rotate in the directions indicated by arrows in Fig. 2. The conduit 60 then forms the inlet conduit for receiving liquid and the conduit 59 forms an outlet of discharge conduit for discharging liquid. The liquid conducted through the inlet conduit 60 into the chamber 53 is forced or induced by the pumping action of the various gears into the inner spaces or chambers 41, 43 and 45 and into the outer spaces or chambers 47, 49 and 51. By the pumping action of the gears the liquid is forced from said inner and outer spaces or chambers into the remaining spaces or chambers 42, 44, 46 and 48, 50 and 52. From the latter the liquid is forced through the openings 56 in the plate 24 into the chamber 55 whence the liquid is conducted through the openings 30 into the outer annular chamber 58 to be discharged therefrom through the outlet conduit 59.

Thus, with an arrangement as described above, the combination of a sun gear with three planetary gears meshing with the sun gear and an outer ring gear, twelve spaces or chambers are formed between adjacent portions of the gears and spacer blocks located between them. During operation, six of these twelve spaces act as inlet or receiving spaces or chambers and six act as outlet or pressure spaces or chambers. The six inlet spaces are connected to a pump inlet chamber and the six outlet spaces are connected to a pump outlet or discharge chamber. Three of the six inlet spaces or chambers are formed between the sun gear and the planetary gears and the other three of the inlet spaces are formed between the planetary gear and the ring gear. Likewise, three of the outlet spaces are formed between the sun gear and the planetary gears and the other three outlet spaces are formed between the planetary gears and the ring gear. Each of the spaces, as pointed out above, is partly defined by a surface of one of the spacer blocks 26, 27 and 28. Liquid flowing, for example, into the inlet space 41 during operation is partly forced into the inner outlet space 42 and partly into the outer space 52, as indicated by arrows. Likewise, liquid flowing into the inlet space or chamber 47 during operation is partly forced into the inner outlet space 42 and partly into the outer outlet space 52. In other words, during operation the liquid flowing into an inner or an outer inlet space or chamber is forced therefrom partly into an inner and partly into an outer outlet space or chamber.

With an arrangement according to my invention, as illustrated in Figs. 1 to 3, a combination of five gears with spacer blocks between them forms twelve inlet and outlet chambers. A similar arrangement with six gears including four planetary gears, a sun gear and a ring gear would form fourteen inlet and outlet spaces as compared with only two inlet and outlet spaces formed by the ordinary gear pump having only two gears. What is more important, with the provision of inner and outer inlet and outlet spaces, the hydraulic forces produced during operation are substantially balanced with regard to each gear. Thus, no resultant force will act on the bearings of the sun gears by the pressure produced in the three uniformly spaced inlet chambers and the three uniformly spaced outlet chambers adjacent the sun gear. The resultant of the forces of the fluid contained in the inlet chambers 41 and 51 adjacent the planetary gear 22 is small and the resultant of the hydraulic forces from the outlet chambers 46 and 52 acting on the bearings of the same planetary gear 22 is likewise small. This balance of hydraulic forces permits of better economy and efficiency of the hydraulic gear and materially lengthens the life thereof. As pointed out in the beginning, the operation of the hydraulic gear as a pump is the same as that described above with either shaft rotated in opposite direction except that the inlet conduits become outlet conduits and the inlet chambers or spaces become outlet chambers or spaces and vice-versa.

The hydraulic gear just described as a pump may operate as a motor by supplying fluid under pressure to either of the conduits 59, 60. In case fluid under pressure is supplied to the conduit 60, the shafts 19 and 33 of the motor rotate in clockwise direction, as indicated in Fig. 2.

In certain cases, it may be desirable to utilize only the inlet and outlet spaces formed adjacent the sun gear or the ring gear. In some cases, it may be desirable to use an arrangement of this kind as a flexible hydraulic connection, coupling, or torque converter, necessitating during some operating conditions a rotatable support for the outer casing. An arrangement embodying such features is illustrated in Figs. 4 and 5. This arrangement comprises a sun gear 65 secured to a shaft 66 supported on ball bearings 67. The sun gear meshes with four circumferentially uniformly spaced planetary gears 68, 69, 70 and 71, each having a shaft 72 supported on both sides by ball bearings 73. The gears are enclosed in a casing which includes a cylinder 74 and end plates 75 and 76. The latter form supports for the ball bearings 67 and 73. The cylinder 74 has four inner projections or spacer blocks 77, 78, 79 and 80 located between adjacent planetary gears. Each block has an axial bore for receiving bolts 81 to fasten the end plates 75, 76 to the cylinder 74. The end plate 75 has a cylindrical projection 82 rotatably supported on a bearing or journal 83 held on a pedestal 84. The pedestal also forms a central journal bearing 85 for the shaft 66. The other end plate 76 has a similar cylindrical projection 86 supported on a bearing 87 held on a pedestal 89 which forms also a central bearing 90 for a shaft 91. The latter has an end portion 92 splined to a central opening of the end plate 76.

Each pedestal 84 and 89 has four ears 93 of which the two lower ones serve as supporting feet. The pedestals are held in spaced relation and securely fastened together by hollow spacer tubes 94 between corresponding ears 93 and bolts 95 projecting through the tubes 94 and the ears 93. With an arrangement of this kind, rotation of the sun gear causes rotation of the planetary gears about their axes only, as long as the latter are free to rotate. If, however, the planetary gears are not free to rotate about their axes only, then rotation of the sun gear causes rotation of the casing including the cylinder 74 and the end plates 75, 76 about the sun gear.

Each spacer 77 to 80 has inner cylindrical surfaces concentric with the adjacent gears. Thus, the spacer 77 has a first cylindrical surface 95 concentric with the sun gear, a second cylindrical surface 97 concentric with the planetary gear 68 and a third cylindrical surface 98 concentric with the sun gear 69. Portions or inner walls of the spacers and the walls of the adjacent gears form spaces or chambers 99, 100, 101, 102, 103, 104, 105 and 106. Four of these eight spaces and chambers, in the present example with the spaces with uneven numbers 99, 101, 103 and 105, are connected through bores 107 to a chamber 108 formed by the pedestal 84 and connected to a conduit 109. The four remaining spaces with even numbers 100, 102, 104 and 106 are connected by bores 110 in the end plate 76 to a chamber 111 formed by the pedestal 89 and connected to a conduit 112.

To operate the arrangement as a pump, the conduit 109 is connected to a source of liquid (not shown) so that the liquid is conducted to the inlet or supply chamber 108. Rotation of the shaft 66 with the sun gear 65 clockwise, as indicated by the arrows in Fig. 4, causes the liquid thus conducted from the inlet chamber 108 through the bores 107 into the inlet chambers or spaces 99, 101, 103 and 105 to be forced therefrom into the outlet spaces 100, 102, 104 and 106, whence the liquid is discharged through the openings 110 to the outlet or discharge chamber 111 to be discharged therefrom through a discharge conduit 112 to a consumer. During this operation the liquid supplied, for instance, to the inlet space 99 is forced therefrom partly along the surface 96 of the spacer 77 into the outlet space 100 and partly along the cylindrical surface 97 of the spacer block 77 into the outlet space 106. Thus, as described in connection with Figs. 1 to 3, the liquid supplied to each inlet space or chamber is discharged therefrom into the two nearest outlet spaces or chambers. During this operation the casing and the shaft 91 remain stationary unless the flow through the discharge conduit 112 is considerably restricted or, from another viewpoint, if the pressure head on the outlet side becomes sufficiently high to cause a torque that will overcome the resistance of shaft 91. In that case the shaft 91 and the casing rotate with a speed increasing with increasing pressure head in the discharge conduit 112. If the pressure head becomes infinite, that is, if conduit 112, for example, is completely closed, as by a valve, the shaft 91 will rotate with a speed equal to the speed of the driven shaft 66.

The arrangement may also be operated as a pump by driving the shaft 91 in counterclockwise direction (in Fig. 4) to rotate the casing with the planetary gears about the sun gear. If the casing in Fig. 4 is rotated in counterclockwise direction, the operation of the arrangement as a pump is the same as that described above, the conduit 109 then constituting an inlet conduit and the conduit 112 a discharge conduit.

During this operation the sun gear remains stationary until the pressure head in the discharge conduit 112 exceeds a certain value whereupon the sun gear is rotated in counterclockwise direction at a speed increasing with increasing pressure head in the discharge conduit 112.

If the sun gear or the casing are rotated in a direction opposite to those described above, the operation is similar except that the inlet conduits and inlet chambers become outlet conduits and outlet chambers, and vice-versa.

During operation of the arrangement as a pump, it may be desirable to maintain either of the shafts 66 and 91 stationary. This may be accomplished by the provision of a brake. To this end I have diagrammatically indicated a brake mechanism 113 for holding the shaft 66 stationary and another brake mechanism 114 for holding the shaft 91 stationary when desired.

The arrangement, as pointed out before, is useful as a flexible hydraulic coupling or torque converter for connecting a drive shaft to a driven shaft. In the drawing I have shown the shaft 66 connected to a drive shaft 115 by means of a clutch or coupling 116 while the shaft 91 is connected to a driven shaft or a load 117 by means of a clutch or coupling 118. The drive shaft 115 may constitute part of a motor or power agency and the driven shaft 117 may form part of a machine to be driven from the shaft 115 through the hydraulic torque converter or coupling arrangement. If then the conduit 109 is connected to a source of liquid, the shaft 91 and the driven shaft 117 connected thereto are rotated at a speed increasing with increasing pressure head in the conduit 112 and, vice-versa, with a decreasing speed upon decreasing pressure head in the conduit 112. If the conduit 112 is completely closed or shut off, the speed of the driven shaft 117 becomes equal the speed of the driving shaft 115. The arrangement may act partly as a pump for forcing liquid under pressure through the conduit 112 and partly as a hydraulic coupling for driving the shaft 117.

The arrangement of Figs. 4 and 5 may also be operated as a motor. To this end one of the conduits 109, 112 is connected to a source of liquid under pressure. If both shafts 66, 91 are free to revolve with the same load on each, they will revolve in opposite directions at half speed. If the torque resistance on one shaft increases, that shaft will slow down and the other shaft will increase in speed. If one shaft is held against rotation, the other shaft will revolve at full speed.

The arrangement of Figs. 4 and 5 may also operate as a variable speed motor. if the conduit 112 is connected to a source of oil pressure and conduit 109 is connected to an oil supply. If shaft 115 is connected to a power source the shaft 117 can be connected to a power absorber. Then when shaft 115 is driven in one direction, say clockwise, and if fluid pressure is sufficiently high in conduit 112 to overcome the torque transmitted, then the shaft 117 will revolve at a higher speed than shaft 115 and in the same direction of rotation. It must do that to let the oil through that is being forced in through conduit 112. The speed increase of shaft 117 over that of shaft 115 will be in proportion to the quantity of oil forced in through conduit 112. The oil in this case will flow through conduit 109 to the oil supply. If the pressure in conduit 112 is low enough, the flow will be in conduit 109 and out conduit 112.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

Hydraulic gear comprising a casing having a cylinder and end plates secured thereto said casing defining an inlet and an outlet, planetary gearing means disposed within the casing and including a sun gear, a shaft rotatably supporting the sun gear, a plurality of planetary gears meshing with the sun gear, means rotatably supporting each planetary gear on the casing, and means including a shaft connected to one end plate and concentric bearings for rotatably supporting said shaft and end plate for rotatably supporting the casing with the planetary gears about the sun gear, separate brake means to hold either one of the shafts stationary, spacer blocks between adjacent planetary gears to define a plurality of inlet and outlet spaces adjacent intermeshing portions of the gears, and means establishing communication of said spaces with the casing inlet and outlet respectively.

JOHN H. DORAN.